3,032,855
PROCESS OF IMPROVING PROPERTIES OF KAPOK FIBER AND LIKE FIBERS AND TEXTILE MATERIALS MADE THEREOF
Somei Sakayanagi, Toyohashi-shi, Japan, assignor to Naka Nippon Kangyo Kabushiki Kaisha, Toyohashi-shi, Japan
No Drawing. Filed July 27, 1959, Ser. No. 829,484
11 Claims. (Cl. 28—75)

This invention relates to a process of treating so-called kapok fiber and like fibers to improve the spinnability and mechanical strength of said fibers and relates to yarn, fabrics and knittings made of said treated fibers.

Kapok fiber consists of a unicell structure as in the case of cotton fiber. However, kapok fiber is 10–30 mm. and 20–40 micron in its length and diameter, respectively, and consists of a thin hollow sheath. Accordingly, kapok fiber has various excellent properties such as high thermal insulation, elasticity, buoyancy, and damp proof property, combination of said excellent properties not being obtained in the other conventional fibers. However, kapok fiber is inferior to the other conventional fibers in its strength and contains no twisted shrinkable scaly pieces which are usually contained in cotton fibers or wool fibers. Accordingly, kapok fiber has been regarded hitherto as unsuitable material for the spinnable basic material in the spinning industry and has been substantially used only for making mattresses and life jackets, whereby application of kapok fiber has been restricted within a narrow range.

An object of this invention is to provide a process of improving mechanical strength and spinnability of the kapok fiber and like fibers.

Another object of this invention is to manufacture improved yarn, fabrics and knittings made of said improved kapok fiber and like fibers.

Said object and other objects of this invention have been attained by depositing noncontinuously a film of firm resin particles on the fiber surface by immersing kapok fiber in a synthetic resin solution or by spraying a synthetic resin solution or resin powders on said kapok fiber.

In embodying the process of this invention, it is preferable to carry out purification and bleaching of the fiber prior to the treatment by resin solution. Purification and bleaching are carried out by a conventional method utilizing a purifying agent and/or an oxidizing agent. However, excessive purification and bleaching must be avoided, because said previous treatment has a close relation to the treatment with resin emulsion in the later process. Bleaching is required for removing only the yellowish or brownish pigment adhering on the fiber.

As the synthetic resin applicable for carrying out the process of this invention, such emulsive resins as silicon resin, acrylonitrile resin, melamine-formaldehyde resin, urea resin and the like which are prepared by emulsion polymerization can be cited for instance. In this emulsion polymerization, a conventional emulsifying agent, stabilizer, surface tension regulator, catalizer, accelerator and buffer are used as the subagents to be added to the monomer which is a main constituent of the product. Accordingly, such nonionic activating agents as soap resin of organic sulphonic oxygen, sulphonate of higher alcohol amine, quaternary ammonium salt, and polyethylenic aliphatic higher ether are used as the emulsifying agent; glue, casein, soluble resin and starch are used as the stabilizer; aromatic alcohol and amine aliphatic alcohol, including carbon atoms of 5—8 are used as the surface tension regulator; ozone, oxygen, persulphates and peroxides are used as the oxidizing agent; chlorinated aliphatic compounds such as tetrachlorocarbon hexachloroethane is used as the oxidizing agent; and phosphates, carbonates and acetates are used as the buffer.

In the application of the above-mentioned synthetic resin emulsion on the kapok fiber, the most important fact to be considered consists in that firm emulsion particles must be made to adhere noncontinuously in a state of film layer onto the fiber surface, but penetration of said emulsion particles into the hollow portion of the fiber must be avoided as much as possible. Otherwise, the hollow portion peculiar to the kapok fiber is filled with other substances, whereby the unique property of the kapok fiber will disappear. Of course, since the kapok fiber contains a larger amount of waxy substance than wool or cotton fiber and penetration of the resin emulsion into the gaps between the fibers is suppressed, favorable formation of a film of resin emulsion can be attained by immersion of the fiber in said emulsion for a short period of time. Noncontinuous deposition of film state resin emulsion on the surface of the kapok fiber can effectively be attained by drying and curing the fiber after immersion thereof in the resin emulsion for a short period of time. The most efficient method for the curing is to use a high frequency induction furnace, but any other device such as a loop dryer, gas dryer, infrared lamp, and the like may be used practically. When the kapok fiber is treated with resin emulsion according to the process of this invention, the surface of the kapok fiber is converted to a rough surface assuming irregular wave form, whereby the action like that of the scales of wool fiber and spinnability are obtained. Moreover, the antidefacibility, elasticity and water proof property of the kapok fiber will be improved remarkably by the film layer consisting of resin emulsion. Accordingly, the kapok fiber treated by the process of this invention can be used for manufacturing spun yarn or blending yarn by blending conventional fiber such as wool, cotton, rayon or staple with the kapok fiber treated by the process of this invention. Of course, excellent webs, fabrics, and knittings can be made by use of said spun yarn or blended yarn. These fabrics and knittings can be effectively used for manufacturing overcoats, life jackets, common clothes, dresses and uniforms, hats, bathing suits, swaddling covers, and the like. Actual treatment of the kapok fiber according to the process of this invention may be described as follows.

*(I) Purification and Bleaching*

(a) Kapok fiber is dipped in a water solution of soap (concentration 3–5%), taken up from said solution, dipped again in a 80% water solution containing sodium silicate (0.5%), soda ash (0.5%) and hydrogen peroxide (5–10%), taken up from said solution, washed with water, dehydrated and then dried. In this treatment, other bleaching agents may be used selectively. In this case, purification and bleaching must be restricted within the range sufficient to remove only the yellowish and brownish pigment, but making the waxy substance consisting of nonsaponifiable substance such as phytosterol, myricyl alcohol ($C_{30}H_{61}OH$) and hydrocarbon and fatty substance consisting of liquid oleic acid, linolic acid glycelide and solid parminic acid glycelide remain as much as possible. Bleaching treatment may be omitted when it is not necessary for later spinning, weaving or knitting.

(b) Kapok fiber is dipped in a water solution of soap (concentration 0.5–1%), taken up from said solution, and then dipped in a solution of the following composition for about six hours.

| | |
|---|---|
| Sodium silicate | 80 gr./100 l. |
| Hydrogen peroxide (35%) | 60–80° C. |
| Temperature | 0.4 l./100 l. |

The fiber treated as above is washed, dehydrated and then dried.

(II) Treatment With Resin (a) The bleached kapok fiber is immersed in a resin solution of the following composition for a short period of time, for instance for 20–30 minutes, and then taken up from said solution.

Composition of the solution:

| | Parts (by weight) |
|---|---|
| Silicon resin emulsion of 40% concentration | 100 |
| Melamine resin or urea resin | 50 |
| Water | 250 |

The fiber taken up from the solution is dehydrated and dried. In this treatment, the finished fiber may contain water of about from 20% to 30%. Besides the above-mentioned resin, other resin such as polyvinyl acetate, acrylonitrile resin, other synthetic resin, and their mixtures may be used.

(b) The water solution of the following composition:

| | Percent |
|---|---|
| Vinyl acetate emulsion (30%) | 0.5–2 |
| Vinyl chloride emulsion (30%) | 0.2–1 | is sprayed on the bleached kapok fiber to make said solution permeate sufficiently in said fiber. The fiber treated with said solution is dehydrated and then dried.

(III) Curing

The kapok fiber having been treated in the above manner is then subjected to a curing process in a high frequency induction furnace or by a suitable heat treating method. The curing conditions in a high frequency induction furnace are, for instance, as follows.

| | | |
|---|---|---|
| Heating output power | kw | 6 |
| Oscillation frequency | mc | 13.6 |
| Temperature rise | ° C | 130 |
| Heating period of time | minutes | 5–10 |

Curing of the kapok fiber is carried out with said fiber in the state of being packed between both electrode plates arranged in a closed chamber of a reduced pressure. When this curing is not necessary, it may be omitted. According to this invention, a film consisting of firm resin emulsion particles is noncontinuously deposited on the surface of kapok fiber, whereby various excellent properties required for spinning are obtained without loss of the natural excellent properties of the kapok fiber. Accordingly, excellent spun yarn of blended yarn can be obtained from kapok fiber. Furthermore, such spun yarn blended yarn can be used to manufacture fabrics or knittings.

The above-description relates substantially to kapok fiber, but this invention can be applied for treatment of other fibers of the same group as kapok fiber with the same excellent results. Accordingly, Bonbar fiber, Ascrepias fiber, vegetable silk fiber and the like which have been regarded as unsuitable substances for spinning can be treated by the process of this invention with excellent results.

What I claim is:

1. The process of improving the spinnability of fibers selected from the group consisting of kapok fibers, bonbar fibers and ascrepias fibers, comprising the steps of depositing on said fiber a synthetic resin emulsion said resin being selected from the group consisting of silicon resin, acryl resin, melamine resin, formaline resin, urea resin, vinyl resin and mixtures thereof; drying said fiber which has thereon said deposited resin emulsion; and, subjecting the dried fiber to a curing heat treatment, whereby firm emulsion particles are made to adhere noncontinuously in a firm layer onto the fiber surface converting it to a rough surface assuming irregular wave form.

2. A process as claimed in claim 1, in which the deposition of resin film on the fiber is carried out by immersing the fiber in a solution of synthetic resin and then drying said fiber.

3. A process as claimed in claim 1, in which the deposition of resin film on the fiber is carried out by spraying the resin solution on the surface of the fiber and then drying said fiber.

4. A process as claimed in claim 1 wherein in the emulsion polymerization of said resin, an emulsifying agent, a stabilizer, a surface tension regulator, catalizer, accelerator and buffer are used as subagents added to the resin constituent.

5. A process as claimed in claim 4 wherein the emulsifying agent consists of material selected from the group consisting of soap resin of organic sulphonic oxygen, sulphonate of higher alcohol amines, quaternary ammonium salt, and polyethylenic aliphatic higher ether.

6. A process as claimed in claim 1 wherein penetration of said emulsion particles into the hollow portion of the fiber is prevented, and non-continuous adherence of the emulsion particles onto the fiber surface is attained by curing the fiber in a high frequency induction furnace.

7. A process as claimed in claim 6 wherein said fibers are treated in said furnace at a temperature of somewhere of the order of 130° C. for a period of between about 5 to about 10 minutes.

8. A process as claimed in claim 6, said curing being carried out by packing said fibers between two electrode plates of a closed chamber at a reduced pressure.

9. A hollow vegetable fiber selected from the group consisting of kapok fibers, bonbar fibers, and ascrepias fibers having adhering to the outer surface thereof noncontinuous particles of a polymerized resin selected from the group consisting of silicon resin, acryl resin, melamine resin, formaline resin, urea resin, vinyl resin, and mixtures thereof.

10. In a yarn made of fibers a hollow vegetable fiber as claimed in claim 9.

11. In a finished textile goods made of yarn, a hollow vegetable fiber as claimed in claim 9.

References Cited in the file of this patent

UNITED STATES PATENTS

| 1,197,396 | Price | Sept. 5, 1916 |
| 1,926,063 | Rossiter et al. | Sept. 12, 1933 |
| 2,142,160 | Swoyer | Jan. 3, 1939 |
| 2,443,512 | Powers | June 15, 1948 |
| 2,885,308 | Healy | May 5, 1959 |